Figure 1:
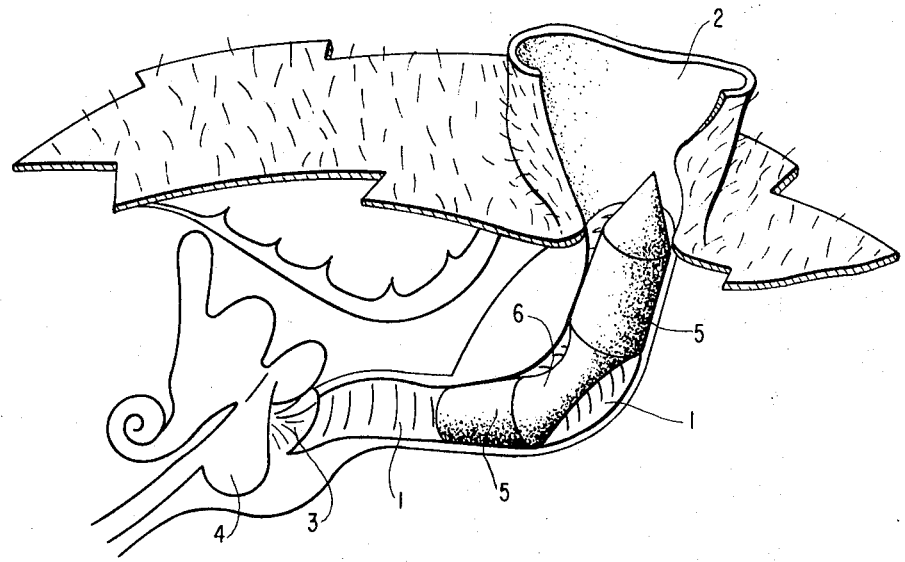

United States Patent

[11] 3,528,419

| [72] | Inventors | Wolfgang Joechle<br>Mexico City, Mexico;<br>Emanuele C. Amoroso, London, England |
|---|---|---|
| [21] | Appl. No. | 670,508 |
| [22] | Filed | Sept. 7, 1967 |
| [45] | Patented | Sept. 15, 1970 |
| [73] | Assignee | Syntex Corporation<br>Panama, Panama<br>a corporation of Panama |
| [32] | Priority | Sept. 8, 1966 |
| [33] | | Great Britain |
| [31] | | No. 40,261/66 |

[54] DEVICES AND METHODS FOR ADMINISTERING PHARMACEUTICAL PREPARATIONS
10 Claims, 5 Drawing Figs.

[52] U.S. Cl. .................................................. 128/270, 128/290

[51] Int. Cl. .......................................... A61f 13/20
[50] Field of Search .................................. 128/260, 261, 270, 271, 290, 291, 285; 119/1

[56] References Cited
UNITED STATES PATENTS

| 1,732,697 | 10/1929 | Ryan ............................ | 128/270 |
| 2,625,158 | 1/1953 | Lee et al. ....................... | 128/260 |
| 2,687,729 | 8/1954 | Slavin ........................... | 128/270 |
| 3,126,887 | 3/1964 | Gordon ......................... | 128/271 |
| 2,629,381 | 2/1953 | Brown .......................... | 128/290 |

*Primary Examiner*—Adele M. Eager
*Attorneys*—Evelyn K. Merker and Donald W. Erickson

ABSTRACT: Methods for administering pharmaceutical preparations to domestic animals and, as novel devices therefor, resilient tampons designed for removeable insertion into the auditory canal of the outer ears of the animals, at least one of which is capable of being impregnated with a predetermined amount of a pharmaceutical preparation.

Patented Sept. 15, 1970

3,528,419

INVENTORS
WOLFGANG JOECHLE
EMANUELE C. AMOROSO.

3,528,419

DEVICES AND METHODS FOR ADMINISTERING PHARMACEUTICAL PREPARATIONS

This invention relates to methods of administration of medicaments or pharmaceutical preparations, and to devices for use in such methods.

More particularly, the present invention relates to devices and methods for administering pharmaceutical preparations, and especially hormonal and steroidal preparations, to domestic animals to achieve a systemic effect.

In the field of drug therapy it is often necessary to administer regularly, e.g. daily, a pharmaceutical preparation in a controlled dosage over an extended period of time. Frequently, too, such a continuous controlled administration is required to lend itself to being arrested or cut off at a precise time; this is true in those instances where administration serves to temporarily suppress or suspend certain natural phenomena, such as estrus, and the cessation of administration causes restoration of the natural functions thus providing for estrus control or synchronization.

In the case of animals particularly the controlled administration of a regulated dose of a pharmaceutical preparation over an extended period of time, and particularly over a time period requiring precise termination, has met with many problems. Surgical subcutaneous implants of solid pellets require skilled hands to implant as well as remove the pellets, as does the injection of a large amount of a crystalline pharmaceutical preparation at a single site. In addition, these two methods share the shortcoming that they do not permit any precise termination of the administration. Intravaginal sponges, as disclosed in Belgian Pat. No. 664,181, also have failed to solve the problem. In the sow, due to the particular construction of its vagina, the sponges are expelled; in the cow, where expulsion is facilitated by vast mucus formation around the sponge, the rate of expulsion is prohibitive, and in the ewe, unless the animal has been pregnant at least once, no installation of the sponge is possible. Where insertion and retention of the vaginal sponges are possible, irritation causing refusal or rejection of insemination, or vaginitis of adhesion of the sponge to the vaginal wall which impair the health and productivity of the animals and may require therapy and/or surgery, have been experienced with excessive frequency. Tapes or cords extending from the sponge outside to facilitate withdrawal, serve as harbors and conductors of microbes and thus contribute to the difficulties. Last but not least, these sponges by definition are limited to the female of the species and hence, lack that broad applicability which long has been a desideratum in this art.

A primary object of this invention is to provide a means for administering pharmaceutical preparations, and in particular hormonal and steroidal preparations, to domestic animals to achieve absorption of the pharmaceutical into the animal's body, which avoids the problems and limitations encountered in the prior art.

Another object of the present invention is to provide a method of administering pharmaceutical preparations to domestic animals to achieve a regulated systemic effect, which is safely applicable to all species without risk of rejection or impairment of health or productivity.

It is a further important object of the invention to provide a device for and a method of administering pharmaceutical preparations to domestic animals which readily permit a precise termination of the time period of such administration.

It is still another object of this invention to provide a device and a method for administering pharmaceutical preparations to domestic animals which are equally applicable to the male as well as the female animal.

Still further objects of the invention include such ease of insertion and removal of the novel devices as to dispense with the need for skilled personnel, and such retention characteristics as to avoid removal or loss by the animal.

Other objects and the manner in which they are attained will become apparent as this specification proceeds.

Pursuant to the above objectives the present invention contemplates providing ear tampons adapted to serve as carriers for a pharmaceutical preparation and comprising a resilient portion coated with, or a resilient pad or wad of absorbent material impregnated with a predetermined amount of a pharmaceutical preparation, for insertion into the auditory canal of the animal's ears, and providing for the administration to the animal of a predetermined dosage of a pharmaceutical preparation over any desired period of time, and precise termination of such period of administration by the simple removal of the devices from the ears of the animals. The invention contemplates providing a pair of ear tampons for insertion in both ears of the animal; while only one of the pair of tampons is required to carry the pharmaceutical preparation, with the other being a blank, the provision of tampons for each ear is essential to avoid interference with the sense of balance of the animals.

Ear tampons according to the invention are illustrated in the attached drawing wherein like reference numerals designate corresponding parts in the several views shown.

In the drawings:

FIG. 1 is a fragmentary diagramatic view of an animal ear having one embodiment of the novel ear tampons of the present invention positioned therein; and FIGS. 2, 3, 4, and 5 are side elevation views of different embodiments of the novel ear tampons of the present invention.

The novel tampons of the present invention are of generally cylindrical shape as shown in the embodiments illustrated in the accompanying drawing. The precise shape of the tampons, preferably, is adapted to the specific configuration of the auditory canal of the particular type of animal for which they are intended. As shown in FIG. 1, the external auditory canal 1 connecting the outer ear and the tympanic membrane 3 and the middle ear takes at about mid-point a sharp turn which in some animals is almost a 90° angle. The ear tampon 5 is constructed of a somewhat resilient material and is preferably provided with a reduced section 6 to facilitate bending around the curvature of the auditory canal 1. The insertion of the ear tampon to extend around the curvature in the auditory canal is not necessary although it is preferred since the possibility of the ear tampon becoming accidentally dislodged by the actions of the animal is greatly diminished. In addition, the greater the surface area of the auditory canal that is contacted by the ear tampon, the more area there is for absorption of the active pharmaceutical preparation into the animal's body.

Figure 2:
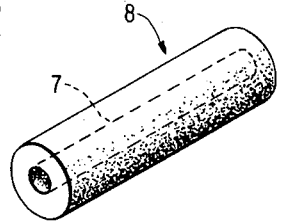

In one embodiment of the invention, see FIG. 2, there is provided an axial perforation or center bore 7 which extends the length of the ear tampon 8. The center bore 7 can be open at each end of the ear tampon, or alternatively, one or both ends of the center bore may be covered or capped. The presence of a center bore in the ear tampon will render the ear tampon somewhat more flexible thereby facilitating insertion of the lower end of the tampon past the curvature in the auditory canal. In addition, the center bore can be used as a reservoir or depot to store or introduce additional pharmaceuticals in which case the inner ear will be closed. Further, the perforation of the ear tampon will also serve to lessen what minor impairment of the animal's hearing may occur when the tampons are in place. A center bore in the ear tampon also may facilitate removal of the tampon.

Figure 3:
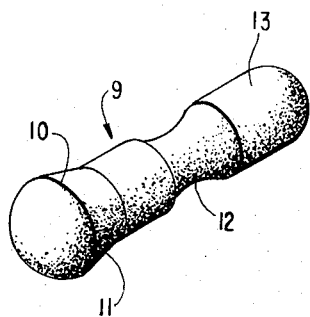

Another embodiment of the novel ear tampon of the present invention is shown in FIG. 3 wherein the tampon 9 is provided with a protuberance 10 which facilitates the grasping of the tampon with fingers, forceps, or the like to remove the tampon. In addition, in this embodiment the shoulders 11 of the protuberance act as a cap to fix the position of the ear tampon in the auditory canal. Portion 10 may be enlarged to fill at least a major part of the ear cavity shown at 2 in FIG. 1 thus increasing the area of absorption. Also, the tampon 9 is pinched or reduced in size at 12 at approximately the mid-point to provide an area for comfortable and convenient positioning of the tampon in cooperation with the curvature in the auditory canal, i.e., the pinched or reduced area 12 will be positioned at the curvature in the auditory canal. The lower area 13 of the ear tampon which extends beyond the curvature of the auditory canal is somewhat enlarged. Enlargement of the lower section of the tampon aids in firmly positioning and securing the tampon in the auditory canal.

Figure 4:
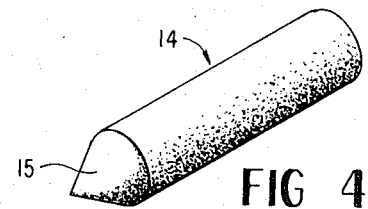

In another embodiment of the novel tampons of the present invention shown in FIG. 4, the tampon 14 is cylindrical in shape and provided at its outer end with a recessed portion such as the cone 15 to facilitate removal of the tampon by affording access to fingers, forceps etc. when extracting the tampon.

Figure 5:
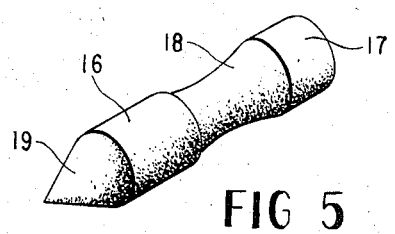

The embodiment of the invention indicated at 5 in FIG. 1 is shown in more detail prior to insertion, in FIG. 5. In this embodiment enlarged cylindrical portions 16 and 17 are connected by the reduced intermediate portion 18 similar in function to portion 12 previously described. The portion 16 may also be provided with a conical end 19 similar to portion 15.

The novel ear tampons of the present invention can be constructed from a wide range of natural and synthetic materials and various combinations thereof. Plastics or large surface, porous, resilient materials may be used for ear tampons to be coated with a pharmaceutical; ear tampons to be impregnated are suitably constructed of absorbent fibers, including natural and synthetic fibers, such as cotton and other cellulosic materials, compressed into a unitary body of a size which can be easily inserted into the auditory canal of the outer ear. In some cases, it is desirable to use a blend of both absorbent and non-absorbent fibers to impart different textures to the tampon. In addition to the use of fibers, there can be employed various flexible or resilient sponge or foam materials, preferably of low density and open-celled, such as various natural and synthetic rubbers, polyurethane (esters and ethers), polystyrene, cellulose and synthetically modified cellulose. The ear tampons can also be formed of wax or paraffin which remains solid at the body temperature of the animal. Also, to facilitate insertion and removal of the ear tampon, some of the fibrous material or sponge, particularly the lower portion of the outer surface of the tampon, can be coated or impregnated with a suitable lubricant such as paraffin waxes, mineral oil, and the like.

It is preferred that the middle part of the tampon be constructed of a material which is more resilient and less dense than that of the outer surface of the tampon in order to facilitate insertion of the ear tampon so that a portion of it extends beyond or past the curvature in the auditory canal. In addition, the soft, resilient, less dense inner core permits the incorporation of a greater quantity of the active pharmaceutical substance and thereby serves as a depot or reservoir.

The impregnated ear tampon is made by dissolving the active pharmaceutical substance in a suitable solvent, such as ethanol, and either dripping this solution into the tampon or immersing the ear tampon in this solution and then drying the tampon to remove the solvent thus leaving the active substance impregnated in dry form in the tampon. This method of making the ear tampons of the invention is preferred for all those applications where a precise termination of the administration of pharmaceutical is of the essence. The active substance is leached out from the absorbent material in the tampon by mucus deriving from the mucus membrane in the auditory canal, and whatever amount of active substance is thus liberated from the tampon and conveyed to the walls of the auditory canal is certain to be immediately absorbed into the system of the animal.

In another method of making the ear tampons of the invention, the active pharmaceutical substance is dissolved or suspended in a less volatile solvent, for example, propylene glycol and the like, and only partially dried, so that a portion of the solvent remains to act as a vehicle to bring the active substance into contact with the membrane of the ear. The novel ear tampons may also be prepared by dissolving the active substance (s) in an oily solution and then dripping a suitable volume onto or into the center of the tampon. The tampon is then used without any drying, with the result that the active substance is administered wholly in solution, and in a solvent that remains as a vehicle for long periods of time, thus assuring continuous contact between the active substance (s) and the membrane of the ear. Still another method of making an ear tampon of the present invention is to prepare a mixture of the desired dosage of the substance and a wax or relatively high molecular weight polyglycol which is liquid at body temperature and insert the prepared mixture into the center of the ear tampon.

By inserting the impregnated or coated ear tampon into the animal's ears, the active pharmaceutical substance carried by the tampon is absorbed by the animal through the mucous membrane lining the auditory canal to thereby achieve a systemic effect. In this manner, a regulated dosage of the active pharmaceutical is conveniently and continuously supplied to the animal's physiological system for any desired period of time. To discontinue treatment or absorption of the active pharmaceutical, the impregnated ear tampons are simply removed or withdrawn from the animal's ears. The installation and removal of the novel ear tampons can be easily accomplished by laymen and therefore lends itself to treatment of herds, flocks or other large groups of animals, such as on feedlots. In order to prevent imbalance, it is important that an ear tampon be placed in both ears of the animal being treated, at least one of which is impregnated with the pharmaceutical preparation to be absorbed into the animal's body.

The novel ear tampons of the present invention are particularly well suited for administration of hormonal or steroidal substances which affect the reproductive physiology of animals such as female cattle, sheep, pigs, goats, dogs and the like domestic animals. In this connection, the tampons are suited for the administration of steroidal progestogens such as 6-chloro-17α-acetoxy-pregna-4,6-diene-3,20-dione, 19-norprogestogens, progesterone, 17α-ethynyl-19-nortestosterone, 6-chloro-3β,17α-dihydroxypregna-4,6-diene-20-one and the corresponding 3-tetrahydropyranyl ether-17-acetate, 6β-chloro-6α,7α 17-acetoxypregn-4-ene-3,20-dione, 5,19-cyclo-17β-hydroxyandrost-1-en-3-one, 2α, 17α-dimethylandrostan-17β-ol-3-one, 17α-ethynyl-17β-tetrahydropyranyloxyestr-4-en-3-one, 17α-ethynylestr-4-ene-3β, 17β-3-tetrahydropyranyl ether-17-acetate, 17α-thynylestr-4-en-3β, 17β-diol 3,17-diacetate, 17α-hydroxyl-19-norpregn-4-ene-3,20-dione-propionate, 17α-acetoxy-6-methylpregna-4,6-diene-3,20-dione, 17α-acetoxy-6α-methylpregn-4-ene-3,20-dione,17β-hydroxy-17α-methallylestr-4-en-3-one, 17α-acetoxy-9α-fluoro-11β-hydroxypregn-4-ene-3,20-dione, and the like. Estrus synchronization is achieved by inserting a progestogen impregnated tampon into each ear of the female cattle which is removed after a precise period of time, usually 18 to 21 days, by simple grasping the tampon with fingers, forceps, tweezers or the like. A regulated estrus normally results within three or four days. In the case of cows, tampons impregnated with about 10 mg. to about 1,000 mg. of a progestogen is suitable for estrus synchronization.

The progestogens or other hormonal compounds or combinations thereof may also be incorporated into the ear tampon for administration to male animals to influence sexual development or suppress sexual activity. For example, a tampon impregnated with 200 milligrams of 6-chloro-17α-acetoxypregna-4,6-diene-3,20-dione can be inserted into the ear of a post-puberal bull. Since the animal is already fully developed sexually, it will continue to grow and gain weight as an untreated male would. However, through the controlled administration of the progestogen by means of the ear tampon, the animal's libido is reduced and it remains much quieter and more docile, thus facilitating maintenance of the bulls on feed lots or pasture.

The ear tampon may also be used as a "depot" for an estrogen-androgen combination. Under certain conditions, as for example in the treatment of an anestrous ewe out of season, the abrupt withdrawal of a progestogen treatment does not produce a completely satisfactory response; that is, it does not consistently produce a full, fertile estrus in the animal. By administering a controlled dosage by the method of this invention of an estrogen alone or in combination with an androgen immediately after withdrawal of the progestogen, the probability of estrus is greatly increased and the estrus is more complete and more fertile. Any estrogen or estrogen-androgen combination is within the scope of this invention but typical combinations are as follows:

For cattle:
    estradiol valerate, 4 mg.
    testosterone enanthate, 65 mg.

For sheep:
    estradiol valerate, 2 mg.
    testosterone enanthate, 45 mg.

For swine:
    estradiol valerate, 2 mg.
    testosterone enanthate, 5 mg.

The ear tampons of the present invention can also be impregnated with corticosteroids such as fluomethasome, $6\alpha, 9\alpha$-difluoro-$16\alpha$-hydroxy-prednisolone-16, 17-acetonide, and the like; antibiotics such as oxytetracycline and the like, and mixtures thereof and other drugs to treat inflammatory conditions and infections. Also, the ear tampons of the present invention containing hormonal substances can be further impregnated or have admixed therewith small amounts of a corticosteroid, antibiotic, and other drugs to reduce the possibility of an inflammatory reaction and to prevent infections.

The novel impregnated ear tampons of the present invention are also advantageously used for the slow release of hormonal substances to stimulate the growth of cattle. One suitable composition for this purpose is a mixture of progesterone and estradiol benzoate. Other hormonal substances presently used as growth stimulants for cattle which are administered by injection, orally, or by implant can also be employed according to the novel procedure of the present invention.

Quite frequently insertion of the novel ear tampons may be enhanced by the application to the ear channel prior to insertion, of a small amount of a local anesthetic such as benzocaine, for example. The invention may be further exemplified by the following examples which, however, are intended solely for purposes of illustration rather than limitation.

EXAMPLE I

On day 1, ear tampons of the type described and shown in the drawings, previously impregnated with 100 mg. of 6-chloro-$17\alpha$-acetoxypregna-4,6-diene-3,20-dione, were inserted into both ears of 15 mature cows in a period of about one-half hour. On day 20, the ear tampons were removed, the removal time being about one-half hour for the 15 animals. On day 23, 11 of the cows so treated came into heat and on day 24, the remaining four cows came into heat.

EXAMPLE II

On day 1, ear tampons of the type described and shown in the drawings, previously supplied with 20 mg. of $17\alpha$-ethynyl-19-nor-testosterone, were inserted into both ears of 30 cycling ewes in a period of about 45 minutes. On day 12, the ear tampons were removed, the removal time being about 45 minutes for the 30 animals. On days 14, 15, and 16, 12, 12, and six ewes, respectively, came into heat.

EXAMPLE III

Example I was repeated except that instead of two ear tampons both impregnated with 100 mg. one ear tampon impregnated with 200 mg. of 6-chloro-$17\alpha$-acetoxypregna-4,6-diene-3,20-dione was employed, while the other ear tampon was a blank containing no active substance. The results were substantially identical with those described in Example I.

EXAMPLE IV

Example II was repeated except that instead of two ear tampons both supplied with 20 mg. of $17\alpha$-ethynyl-19-nor-testosterone, one ear tampon coated with 40 mg. of said substance was employed while the other ear tampon was a blank carrying no active substance. The results were substantially the same as those reported in Example II.

EXAMPLE V

In order to prevent a bitch weighing 30 kg from coming into heat at a time when a male dog temporarily shared the household, ear tampons of the type described and shown in the drawings, each impregnated with 15 mg. of 6-chloro-$17\alpha$-acetoxypregna-4,6-diene-3,20-dione were installed in the ears of the bitch at a time between month three and month five following its last heat, thus preventing the bitch from coming into heat at month 6. The ear tampons were replaced every two to three months until the need for a delay of heat ceased to exist, at which time the ear tampons were withdrawn and the bitch was restored to its normal cycle.

EXAMPLE VI

A male dog with a body weight of 10 kg suffering from arthritis, received in each ear a tampon of the type described and shown in the drawing and impregnated with 0.5 mg. of flumethasone. Relief was afforded for three to four weeks after which time the supply of flumethasone was replenished by feeding 0.5 mg. of flumethasone in ethanol solution, by means of a dropper, to each tampon without removing the tampons.

We claim:

1. An ear tampon designed for introduction into the auditory canal of domestic animals, comprising a cylindrically shaped resilient material having a recessed intermediate portion for enabling the tampon to pass around the bend in the auditory canal so its inner end comes to a rest at a point beyond said bend.

2. An ear tampon according to claim 1 characterized in that the material, in addition to being resilient, is sufficiently porous for effective impregnation with a pharmaceutical.

3. An ear tampon according to claim 1, characterized in that it carries a pharmaceutical coating.

4. An ear tampon according to claim 1 characterized in that it has a conical end portion to facilitate insertion and removal of the tampon from the auditory canal.

5. A method for administering pharmaceutical preparations to domestic animals comprising inserting a tampon comprising a cylindrically shaped resilient material having a recessed intermediate portion into the auditory canal of both ears of said animal, at least one of the tampons carrying a predetermined amount of the pharmaceutical preparation.

6. The method of claim 5 wherein the resilient material comprising the ear tampon is absorbent and has impregnated therein the pharmaceutical preparation dissolved in a suitable solvent.

7. The method of claim 5 wherein the tampon is coated with the pharmaceutical preparation.

8. The method of claim 5 wherein the pharmaceutical preparation is a steroid of the pregnane series.

9. The method of claim 5 wherein the pharmaceutical preparation is a steroid of the androstane series.

10. The method of claim 5 wherein the pharmaceutical preparation is a steroid of the estrane series.